United States Patent [19]

Robbins, III et al.

[11] Patent Number: 5,549,213
[45] Date of Patent: *Aug. 27, 1996

[54] REUSABLE RE-COLLAPSIBLE CONTAINER AND RESEALABLE CAP

[75] Inventors: Edward S. Robbins, III, 2802 E. Avalon Ave., Muscle Shoals, Ala. 35662; Ronald Schumann, Florence, Ala.

[73] Assignee: Edward S. Robbins, III, Muscle Shoals, Ala.

[*] Notice: The term of this patent shall not extend beyond the expiration date of Pat. No. 5,417,337.

[21] Appl. No.: 134,656

[22] Filed: Oct. 12, 1993

Related U.S. Application Data

[63] Continuation-in-part of Ser. No. 47,185, Apr. 16, 1993, Pat. No. 5,417,337, which is a continuation-in-part of Ser. No. 12,122, Feb. 1, 1993, abandoned, which is a continuation-in-part of Ser. No. 789,838, Nov. 12, 1991, Pat. No. 5,226,551.

[51] Int. Cl.⁶ ........................................................ B65D 6/12
[52] U.S. Cl. .............................. 220/8; 220/288; 220/304; 220/666; 215/329; 215/354; 215/382
[58] Field of Search ................................. 220/8, 666, 288, 220/304; 215/1 C, 11.3, 329, 352, 354, 382

[56] References Cited

U.S. PATENT DOCUMENTS

| | | |
|---|---|---|
| 625,719 | 5/1899 | Crofford. |
| 640,418 | 1/1900 | Royer. |
| 1,040,652 | 10/1912 | Douglas. |
| 1,048,935 | 12/1912 | Brady. |
| 2,784,882 | 3/1957 | DuBois. |
| 2,880,902 | 4/1959 | Owsen. |
| 2,893,167 | 7/1959 | Davidson. |
| 2,899,110 | 8/1959 | Parker. |
| 2,985,915 | 5/1961 | Winstead. |
| 3,143,429 | 8/1964 | Swanson et al.. |
| 3,156,383 | 11/1964 | Melli. |
| 3,220,544 | 11/1965 | Lovell. |
| 3,286,872 | 11/1966 | Burdick, Jr.. |
| 3,301,293 | 1/1967 | Santelli. |
| 3,326,421 | 6/1967 | Peace. |
| 3,329,298 | 7/1967 | Demas. |
| 3,433,380 | 3/1969 | Kawchitch ............................... 215/329 |
| 3,467,283 | 9/1969 | Kinnavy. |
| 3,494,509 | 2/1970 | McGuire. |
| 3,578,415 | 5/1971 | Hiltz. |
| 3,595,418 | 7/1971 | Adcock et al. ...................... 215/354 X |
| 3,608,268 | 9/1971 | Lauritzen. |
| 3,690,522 | 9/1972 | Chlystun. |

(List continued on next page.)

FOREIGN PATENT DOCUMENTS

| | | |
|---|---|---|
| 1301970 | 8/1969 | Germany. |
| 2340967 | 3/1974 | Germany. |
| 3937456 | 5/1991 | Germany. |
| 4-102544 | 4/1992 | Japan. |
| 2109247 | 6/1983 | United Kingdom. |
| 2138525 | 10/1984 | United Kingdom. |
| WO88/05014 | 7/1988 | WIPO. |

*Primary Examiner*—Stephen K. Cronin
*Attorney, Agent, or Firm*—Nixon & Vanderhye P.C.

[57] ABSTRACT

A container and associated cap assembly includes a container body having an open upper end defined by an annular rim, the rim having a substantially horizontal uppermost edge surface and a radially outwardly and downwardly extending bevelled surface. The cap has a top wall, a radially outer depending skirt portion and a radially inner depending skirt portion. The skirt portions are connected radially by an internal cap surface which includes a first substantially horizontal surface portion extending radially away from the radially inner skirt; a second downwardly and outwardly inclined sealing surface portion, and a third radiused surface portion connected to the radially outer skirt. The second downwardly and outwardly inclined sealing surface is sealingly engageable with the bevelled surface of the annular rim such that the substantially horizontal uppermost edge surface is axially spaced from the cap top wall upon full threaded engagement between said cap and said container body.

9 Claims, 2 Drawing Sheets

U.S. PATENT DOCUMENTS

| | | |
|---|---|---|
| 3,707,241 | 12/1972 | Taylor . |
| 3,864,771 | 2/1975 | Bauer et al. . |
| 3,875,941 | 4/1975 | Adair . |
| 3,939,888 | 2/1976 | Scernato . |
| 4,087,024 | 5/1978 | Martin et al. . |
| 4,219,137 | 8/1980 | Hutchens . |
| 4,383,620 | 5/1983 | Mumford .............................. 215/329 |
| 4,428,507 | 1/1984 | Sneider . |
| 4,456,134 | 6/1984 | Cooper . |
| 4,492,313 | 1/1985 | Touzani . |
| 4,706,829 | 11/1987 | Li . |
| 4,712,699 | 12/1987 | Lutz . |
| 4,775,564 | 10/1988 | Shriver et al. . |
| 4,805,799 | 2/1989 | Robbins, III . |
| 4,815,615 | 3/1989 | Phlaphongphanich . |
| 4,844,273 | 7/1989 | Hawkins . |
| 4,846,376 | 7/1989 | Palmer . |
| 4,865,211 | 9/1989 | Hollingsworth . |
| 4,873,100 | 10/1989 | Dirksing et al. . |
| 4,875,576 | 10/1989 | Torgrimson et al. . |
| 4,892,126 | 1/1990 | Bucheler et al. . |
| 4,925,055 | 5/1990 | Robbins, III et al. . |
| 4,930,644 | 6/1990 | Robbins, III . |
| 4,955,493 | 9/1990 | Touzani . |
| 4,979,628 | 12/1990 | Robbins, III . |
| 5,002,193 | 3/1991 | Touzani . |
| 5,020,683 | 6/1991 | Strassheimer ........................... 215/354 |

REUSABLE RE-COLLAPSIBLE CONTAINER AND RESEALABLE CAP

RELATED APPLICATIONS

This application is a continuation-in-part of application Ser. No. 08/047,185 filed Apr. 16, 1993, now U.S. Pat. No. 5,417,337, which is a continuation-in-part of application Ser. No. 08/012,122 filed Feb. 1, 1993, which in turn is a continuation-in-part of application Ser. No. 07/789,838 filed Nov. 12, 1991, now U.S. Pat. No. 5,226,551.

BACKGROUND AND SUMMARY OF THE INVENTION

The above identified '185 application relates to reusable and re-collapsible containers, and particularly to a one-piece container construction having a peripheral side wall which is arranged to include at least three sections of differential wall thickness and diameter to thereby permit movement of the container from an extended to a collapsed position by reason of a telescoping relationship between the various sections of the peripheral side wall. This continuation-in-part application is directed specifically to a novel interaction between the container and an associated cap which provides an added measure of resealability upon repeated uses of the cap.

Collapsible containers, drinking cups and the like are, of course, well known. For example, in applicant's own prior U.S. Pat. No. 4,930,644, a collapsible, thin film plastic container is disclosed wherein a major portion of the container side wall has a reduced wall thickness to permit random collapse of the side wall. In U.S. Pat. No. 4,865,211, a plastic bottle having a uniform wall thickness throughout the side wall, is configured to permit collapsing of the container through telescoping movement of one portion of the side wall into another portion of the side wall.

In U.S. Pat. No. 4,875,576, a container is disclosed wherein an intermediate portion of the side wall incorporates a bellows-type arrangement for facilitating collapse and extension of the container. The patent also discloses the use of helical creases which spiral or angle between first and second portions of the container side wall to facilitate collapsing action of the creased portion of the side wall.

In U.S. Pat. No. 4,873,100, a bi-stable, expandable plastic bottle is disclosed which incorporates a bellows-type side wall for movement between collapsed and extended positions.

In U.S. Pat. No. 2,880,902, a collapsible, drinking cup (or camera bellows) is disclosed wherein the side wall is composed of alternating thick and thin portions.

The present invention incorporates a number of features not previously found in the prior art and which result in simple, easy-to-use, low cost containers which may be used and reused by the consumer as desired, and which may be stored in a collapsed condition, maximizing storage space, etc. At the same time, by significantly reducing the thickness of the container side wall in an intermediate portion thereof, source reductions in the amount of plastic required to manufacture the containers are realized.

More specifically, the invention provides a one-piece, extruded and blow molded container formed with a peripheral side wall divided into upper, intermediate and lower portions, with the upper and lower portions having significantly greater wall thicknesses than the intermediate portion. For example, the intermediate portion may have a wall thickness of between about 2 and about 12 mil, and preferably about 8 mil, which permits the intermediate portion to reverse fold as the upper and lower portions, which may each have a wall thickness in the range of about 25–60 mil and preferably about 45 mil, are moved toward one another in the aforementioned telescoping relationship.

It is also a feature of the invention that the peripheral side wall include surface configurations which facilitate the axial collapse and extension of the container. Thus, in each of the disclosed embodiments, the intermediate peripheral side wall portion is formed with an inwardly and downwardly tapered profile, i.e., a decreasing diameter in the downward direction; and the lower peripheral side wall portion is formed with a downwardly and outwardly tapered profile, i.e., an increasing diameter in the downward direction. In addition, at the interface between the three sections, the changes in wall thickness provide a pair of annular steps which, in effect, provide a crease to facilitate the folding or collapsing action. The collapsing action is also facilitated by reason of the fact that the maximum and minimum diameters of the tapered intermediate side wall portion create a radial clearance between the lower edge of the upper side wall portion and the upper edge of the lower side wall portion, so that there is minimal frictional engagement between the upper, intermediate and lower side wall portions during collapsing and extending.

Another feature in each of the disclosed embodiments relates to the provision for a gripping area at the lower end of the lower portion of the peripheral side wall, particularly designed to facilitate the extension of the container from the collapsed position.

In an exemplary embodiment, the upper side wall portion of the container has a substantially uniform diameter in combination with a relatively rigid (but still flexible) annular rim. The rim itself may have the same or greater thickness dimensions than the upper and lower side wall portions.

In the exemplary embodiment, the upper end of the container, adjacent the rim edge, is provided with an external screw thread adapted to receive a screw-on type cap. In accordance with this continuation-in-part application, the surface adjacent the uppermost edge of the container rim is tapered downwardly and outwardly to provide, in effect, a beveled edge, for interaction with an associated cap, as described in greater detail below.

The unique cap construction in accordance with this invention includes a top wall and a radially outer depending skin provided with a screw thread on the internal surface of the skirt adapted to mate with the external screw thread provided on the upper end of the container. The cap construction is also formed with a radially inner depending skin which is adapted to engage the interior surface of the upper end of the container in order to support the latter in the manner described in the above identified parent application. The particularly unique aspect about the cap construction in accordance with this continuation-in-part application, relates to the interior surface configuration of the cap between the radially inner and outer depending skirts. This interior surface includes three surface portions. First, there is a substantially horizontal surface adjacent the radially inner annular skirt portion which extends radially outwardly where it intersects with a second downwardly and radially outwardly inclined surface which, in turn, merges with a third radiused surface which intersects the radially outer depending skirt. The second or inclined surface (which is substantially straight), provides a sealing area which is adapted to be sealingly engaged by the beveled upper edge of the container in such a manner that an axial space remains between the uppermost edge of the container and the first substantially horizontal surface of the cap adjacent the radially inner skirt.

By providing cooperating surfaces for engagement within a tapered sealing area in such a manner that an axial space remains between the top of the cap and the uppermost edge of the container, an effective seal may be effected repeatedly even though the uppermost edge of the container may not be substantially true, as is often the case in blow molded containers which are trimmed mechanically by mechanical cutters, slitters, etc. In addition, it will be appreciated that in light of the thin wall construction of the container, and the attendant flexibility thereof, there is a tendency for the container to flex radially, thereby causing the cap to bow upwardly and out of a normal sealing engagement. However, because of the seal effected along the mating tapered surfaces, even in the event the cap does bow upwardly, a seal will be maintained since the seal is, in effect, adjustable within the sealing area.

In addition, as the container is used and re-used, and as the cap is repeatedly secured and removed from the container, the cap will tend to draw closer to the upper edge of the container each time it is tightened. The unique seal arrangement in accordance with this invention also accommodates this tendency. This is because, already noted, the sealing action may occur at different locations within the sealing area along the mating tapered surfaces, throughout the useful life of the container.

Accordingly, in its broader aspects, the present invention relates to a container and associated cap assembly comprising a container body having an open upper end defined by an annular rim, the rim having a substantially horizontal uppermost edge surface and a radially outwardly and downwardly extending beveled surface; and a cap having a top wall, and a radially outer depending skirt, the radially outer depending skirt connected to the top wall by an internal cap surface which includes a downwardly and outwardly inclined surface portion which engages the bevelled surface such that the substantially horizontal uppermost edge surface is axially spaced from the cap top wall upon full threaded engagement between the cap and the container body.

Other objects and advantages of the subject invention will become apparent from the detailed description as follows.

DETAILED DESCRIPTION OF THE DRAWINGS

Figure 1:
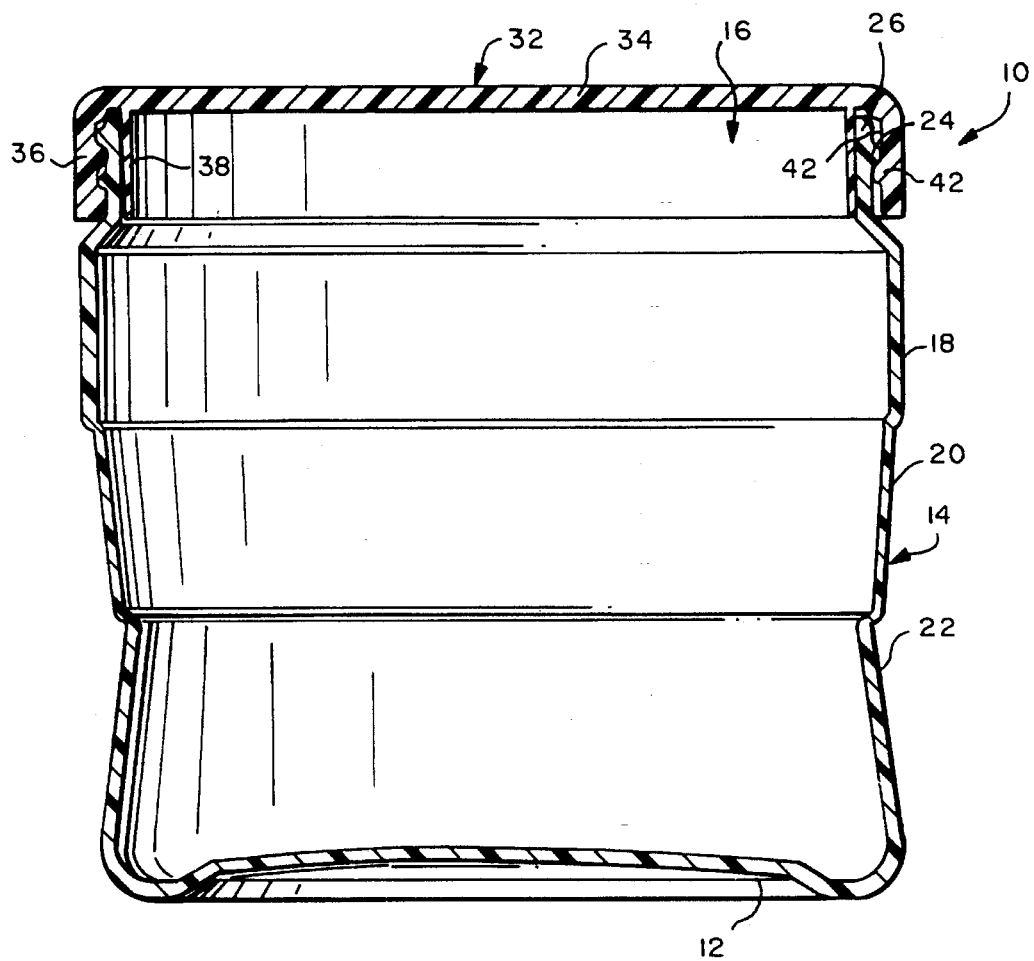
FIG. 1 is a side elevation of a container and an associated cap in accordance with the invention.
Figure 2:
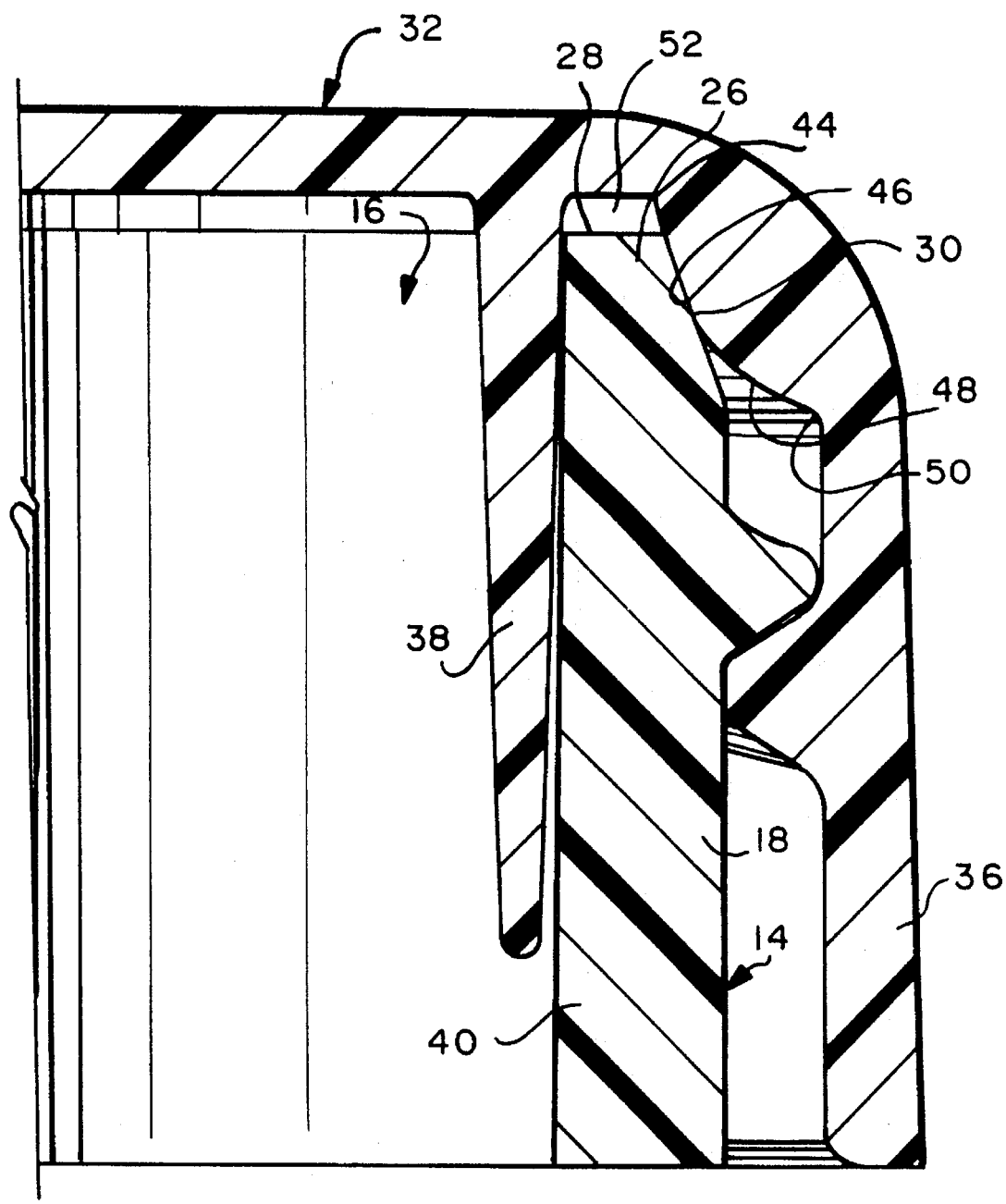
FIG. 2 is an enlarged detail taken from FIG. 1.

With reference now to FIGS. 1 and 2, an extrusion/blow molded container 10 in accordance with an exemplary embodiment of the invention generally includes a bottom wall 12 and a peripheral side wall 14 extending generally upwardly from the bottom wall 12. The container may be made of low density polyethylene (LDPE), polypropylene or other suitable plastic material. In the embodiment described herein, the side wall is generally circular (when viewed in cross sections taken through the container) but it will be appreciated that the container may have other suitable shapes as well. The peripheral side wall terminates at an open upper end 16.

Figure 3:
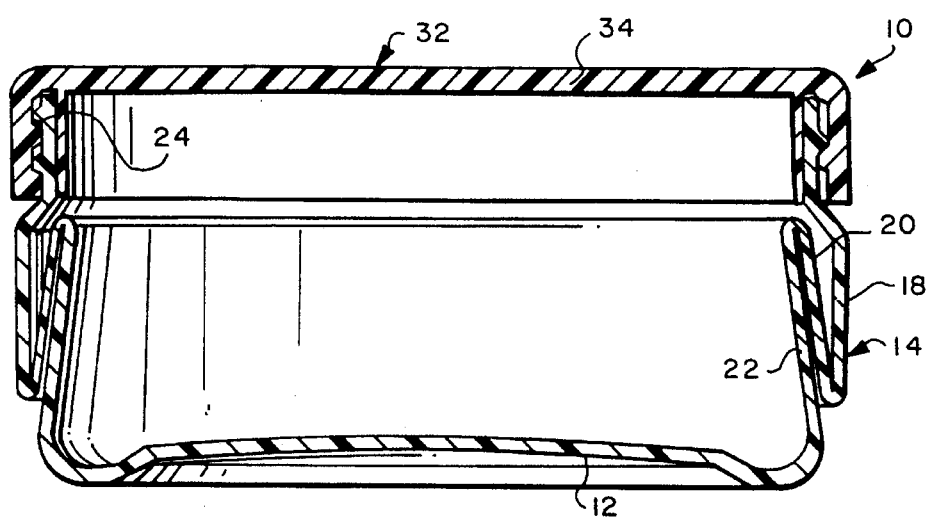
FIG. 3 is a side section of the container of FIG. 1, but in a collapsed condition.

The peripheral side wall 14 in this exemplary embodiment is formed to include three axial portions including an upper portion 18, an intermediate portion 20 and a lower portion 22. The upper and intermediate portions 18 and 20 have generally similar axial lengths, while the lower portion 22 has a somewhat greater axial length for a reason described further below. An exemplary thickness for side wall portions 18 and 22 may be, for example, in the range of about 25 to 60 mil and preferably about 45 mil. The bottom wall 12 may be substantially thicker if desired. As described in parent application Ser. No. 08/047,185, the intermediate side wall portion 20 may have a thickness between about 2 and 12 mil and preferably about 8 mil, and the ratio between the thickness of each of the upper and lower side wall portions to the thickness of the intermediate side wall portion should be at least 3.75 to 1 and preferably about 5 to 1. The container is collapsible to the configuration illustrated in FIG. 3, in the manner more fully described in the parent '185 application.

The upper end of the container side wall 14 is formed with an external screw thread 24 and terminates at an tipper annular rim 26. The rim 26 is formed with an uppermost substantially horizontal edge 28 and an exteriorly located beveled or tapered surface 30 which extends downwardly and radially outwardly relative to the substantially horizontal uppermost edge 28.

The cap 32 in accordance with this invention includes a top wall 34, a radially outer depending skirt portion 36 and a radially inner depending skirt portion 38. The radially outer depending skirt portion 36 is formed on its interior surface 40 with a screw thread 42 adapted to mate with the screw thread 24 formed on the exterior surface of the container. As explained in the parent application, the radially inner skirt portion 38 is designed to provide radial support for the upper end of the container and thus preclude any radially inwardly directed flexing of the container as the cap is applied. This continuation-in-part application, however, is specifically directed to the configuration of the interior surface of the cap between the radially inner skirt portion 38 and the radially outer skirt portion 36. As best seen in FIG. 2, the interior surface of the cap in the area between the inner and outer depending skirt portions is essentially comprised of three surfaces. First, there is a substantially horizontal, radially outwardly extending surface 44 extending radially away from the inner skirt portion 38, and towards the outer skin portion 36. This surface 44 which is in fact a continuation of the top wall 34 (as defined by the top wall thickness), merges with a second tapered or inclined surface 46 which extends downwardly and radially outwardly relative to the surface 44. The second surface 46, in turn, merges with a third radiused surface 48 which extends to the radially outer depending skirt portion 36, with the interface defined by a radius 50. The radiused surface 48 insures that the corner sealing action will occur only along a sealing area at the interface of surfaces 30 and 46.

In the exemplary embodiment, where the cap outer diameter is approximately 4.5 inches, and where the outer diameter of the container side wall is approximately 4.25 inches, the first surface 44 has a radial dimension of approximately 0.020 inches. Second surface 46 tapers at an angle of approximately 69.78 degrees relative to horizontal, and the third surface 48 is defined by a radius of about 0.094 inches. These dimensions may vary, of course, with the size of the cap and associated container.

When the cap 32 is applied to the container 10 in a fully threadably engaged position as shown in FIG. 2, there is an axial space 52 between the uppermost edge 28 of the container rim 26, and a horizontal surface 44 of the cap 32. At the same time, there is a sealing engagement between the tapered surface 46 of the cap and the beveled or tapered surface 30 of the container rim. The axial extent of these surfaces defines a sealing area which permits resealing along the respective surfaces 30, 46 even after repeated use of the container and its associated cap. In other words, while there is a tendency for the cap to creep relatively to the container rim upon repeated reapplications of the cap, this creeping action is accommodated by the tapered surfaces 30, 46, in that the seal will occur at the centerline interface of these two surfaces, and this centerline may change within the sealing area. This arrangement also maintains the desirable seal even in the event of a slight upward bowing of the cap 32 upon hard rotation of the cap during application.

It will be appreciated that resealability feature as described in this continuation-in-part application may be incorporated into any flexible container construction (collapsible or not) which utilizes a screw thread for securing a cap to the container, including (but not limited to), for example, additional embodiments disclosed in the parent '185 application.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container and associated cap assembly comprising a container body having a bottom peripheral wall, a relatively flexible peripheral wall and an open upper end defined by an annular rim, where the side wall is movable between axially extended and collapsed positions and, in the extended position, having lower and upper relatively thicker side wall portions and an intermediate relatively thinner side wall portion; and wherein said intermediate side wall portion is tapered downwardly radially inwardly, and said lower side wall portion is tapered downwardly radially outwardly substantially to said bottom wall, such that in said collapsed position, said lower side wall portion is partially telescoped within said upper side wall portion with said intermediate portion reverse folded therebetween, and with an uppermost edge of said lower side wall portion radially spaced away from said upper side wall portion, said rim having a substantially horizontal uppermost edge surface and a radially outwardly and downwardly extending bevelled surface extending between said upper edge and said peripheral side wall, said peripheral side wall having a first cap securing structure thereon in proximity to said rim; and a cap having a top wall, and a radially outer depending skirt, said radially outer depending skirt connected to said top wall by an internal cap surface which includes a downwardly and outwardly inclined surface portion which engages said bevelled surface such that said substantially horizontal uppermost edge surface is axially spaced from said cap top wall upon full engagement between said cap and said container body, said radially outer depending skirt having a second cap securing structure thereon for cooperative engagement with said first cap securing structure and further wherein said cap comprises a radially inner depending skirt which engages an inner surface of said open upper end of said container body laterally adjacent said first and second cap securing structures.

2. The container and associated cap assembly of claim 1 wherein said internal cap surface lies radially between said radially outer and said inner skins.

3. The container and associated cap assembly of claim 2 wherein said internal cap surface includes a substantially horizontal surface portion which extends radially outwardly from said radially inner skirt and which merges with said downwardly and outwardly inclined surface portion.

4. The container and associated cap assembly of claim 3 wherein said downwardly and outwardly inclined surface portion merges with a radiused surface portion connected to said radially outer depending skirt.

5. The container and associated cap assembly of claim 1 wherein said downwardly and outwardly inclined surface is substantially straight.

6. A container and associated cap comprising a container body having a bottom wall and a relatively flexible, peripheral side wall extending upwardly from said bottom wall to an annular rim defining an open upper end, said side wall movable between axially extended and collapsed positions and, in the extended position, having lower and upper relatively thicker side wall portions and an intermediate relatively thinner side wall portion; and wherein said intermediate side wall portion is tapered downwardly radially inwardly, and said lower side wall portion is tapered downwardly radially outwardly substantially to said bottom wall, such that in said collapsed position, said lower side wall portion is partially telescoped within said upper side wall portion with said intermediate portion reverse folded therebetween, and with an uppermost edge of said lower side wall portion radially spaced away from said upper side wall potion, said rim having a substantially horizontal uppermost edge surface and a radially outwardly and downwardly extending bevelled surface extending between said upper edge and said peripheral side wall, said peripheral side wall having a first cap securing structure thereon in proximity to said rim; a cap having a top wall, and a radially outer depending skirt and a radially inner depending skirt, said radially outer depending skirt connected to said top wall by an internal cap surface which includes a first substantially horizontal surface portion extending radially outwardly to merge with a second downwardly and outwardly inclined surface portion, which, in turn, merges with a third radiused surface portion connected to said radially outer skirt, said bevelled surface engaging said second downwardly and outwardly inclined surface portion to thereby effectively seal said cap to said container body, said radially outer depending skirt having a second cap securing structure thereon for cooperative engagement with said first cap securing structure and further wherein said radially inner depending skirt of said cap is adapted to engage an inner surface of said open upper end of said container body laterally adjacent said first and second cap securing structures.

7. The container and associated cap assembly or claim 6 wherein an axial space is maintained between an uppermost edge of said annular rim and said first substantially horizontal surface portion to thereby create an adjustable sealing area along said bevelled surface and said second downwardly and outwardly inclined surface portion.

8. A container and associated cap assembly comprising a container body having an open upper end defined by an annular rim, said rim having a substantially horizontal uppermost edge surface and a radially outwardly and downwardly extending bevelled surface wherein the side wall is movable between axially extended and collapsed positions and, in the extended position, having lower and upper relatively thicker side wall portions and an intermediate relatively thinner side wall portion; and wherein said intermediate side wall portion is tapered downwardly radially inwardly, and said lower side wall portion is tapered downwardly radially outwardly substantially to said bottom wall, such that in said collapsed position, said lower side wall portion is partially telescoped within said upper side wall portion with said intermediate portion reverse folded therebetween, and with an uppermost edge of said lower side wall portion radially spaced away from said upper side wall portion; said rim having a substantially horizontal uppermost edge surface and a radially outwardly and downwardly extending bevelled surface extending between said upper edge and said peripheral side wall, said peripheral side wall having a first cap securing structure thereon in proximity to said rim; and a cap having a top wall, a radially inner skirt adapted to engage an inner surface of said open upper end of said container body, and a radially outer skirt, said radially outer skirt connected to said top wall by an internal cap surface which includes a first substantially horizontal surface portion extending radially outwardly to merge with a second downwardly and outwardly inclined surface portion, which, in turn, merges with a third radiused surface portion connected to said radially outer skirt, said bevelled surface engaging said second downwardly and outwardly inclined surface portion to thereby effectively seal said cap to said container body, said radially outer depending skirt having a second cap securing structure thereon for cooperative engagement with said first cap securing structure and further wherein said radially inner depending skirt engages an inner surface of said open upper end of said container body laterally adjacent said first and second cap securing structures.

9. The container and associated cap assembly or claim 8 wherein an axial space is maintained between an uppermost edge of said annular rim and said first substantially horizontal surface portion to thereby create an adjustable sealing area along said bevelled surface and said second downwardly and outwardly inclined surface portion.

* * * * *